Aug. 15, 1961 R. M. GORDON 2,995,821
RIVETED HANDLE FOR A KNIFE OR SIMILAR ARTICLE
AND RIVET DEVICE THEREFOR
Filed June 18, 1958 2 Sheets-Sheet 1
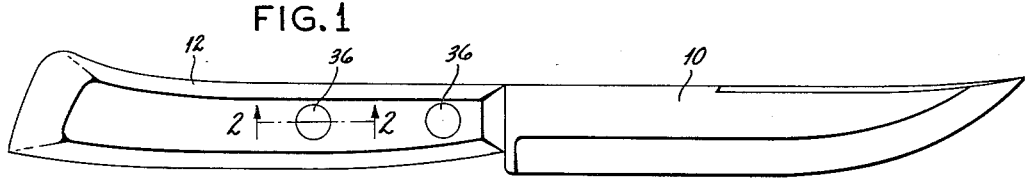
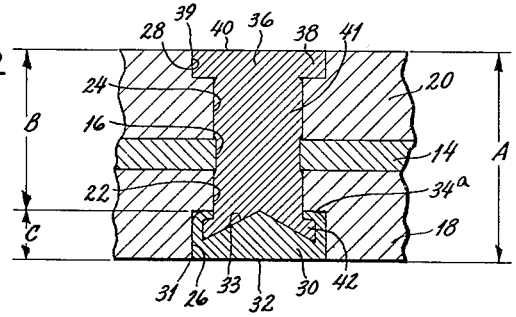
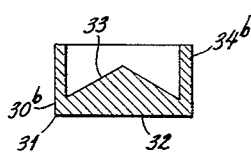
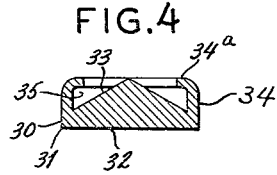
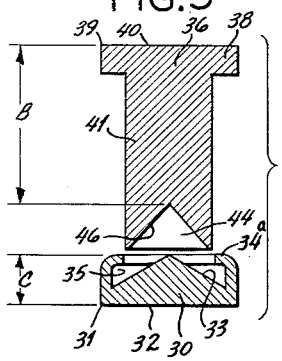
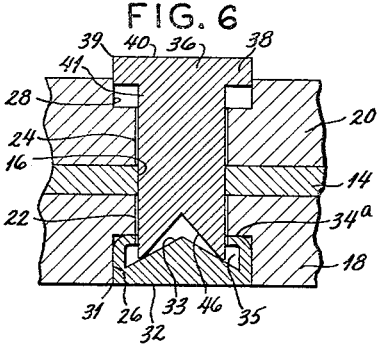
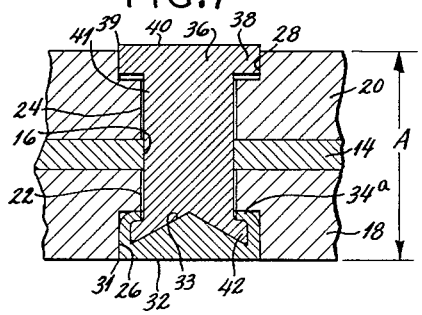
INVENTOR
ROBERT M. GORDON
BY Teller + McCormick
ATTORNEYS Aug. 15, 1961 R. M. GORDON 2,995,821
RIVETED HANDLE FOR A KNIFE OR SIMILAR ARTICLE
AND RIVET DEVICE THEREFOR
Filed June 18, 1958 2 Sheets-Sheet 2

*INVENTOR*
*ROBERT M. GORDON*

BY Teller & McCormick

*ATTORNEYS*

United States Patent Office 2,995,821
Patented Aug. 15, 1961

2,995,821
RIVETED HANDLE FOR A KNIFE OR SIMILAR ARTICLE AND RIVET DEVICE THEREFOR
Robert M. Gordon, Litchfield, Conn.
(Westward Road, Woodbridge, Conn.)
Filed June 18, 1958, Ser. No. 742,783
7 Claims. (Cl. 30—344)

The invention relates to a riveted handle for a knife or similar article and to a rivet device therefor.

One of the objects of the invention is to provide a multiple part handle wherein the several parts are firmly connected with each other by simple and inexpensive rivet devices that have sharp corners so that they completely fill the outer portions of the counterbores in said handle parts. The stated complete filling of the counterbores is essential to avoid any crevices in which food or other material could collect.

Another object of the invention is to provide a simple and inexpensive two-part rivet device for use in a handle such as above set forth, said two-part device including a cap and a rivet which are so related to each other that the rivet, upon the application of pressure, will interengage the cap and interlock therewith and will expand to firmly grip the blade shank within the handle.

The drawings show two embodiments of the invention, but it will be understood that various changes may be made from the constructions disclosed, and that the drawings and description are not to be construed as defining or limiting the scope of the invention, the claims forming a part of this specification being relied upon for that purpose.

Of the drawings:

FIG. 1 is a plan view of a knife having a handle embodying the invention.

FIG. 2 is an enlarged fragmentary vertical sectional view taken along the line 2—2 of FIG. 1.

FIG. 3 is a sectional view of the rivet cap in an intermediate stage of manufacture.

FIG. 4 is a sectional view similar to FIG. 3, but showing the completed rivet cap.

FIG. 5 is a vertical sectional view showing the rivet and the cap positioned for relative movement into engagement with each other.

FIG. 6 is a view similar to FIG. 2, but with the cap in its fully assembled position and with the rivet engaged with the cap before the application of pressure.

FIG. 7 is a view similar to FIG. 6, but with the rivet in an intermediate stage of engagement with the cap.

Figure 8:
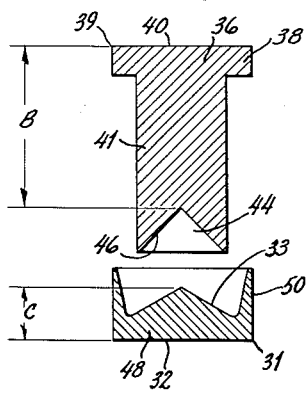
FIG. 8 is a view similar to FIG. 5, but showing an alternative cap.

While the invention is not so limited, a knife is illustrated in FIG. 1 as constituting a representative embodiment of the invention. The invention is equally applicable to other similar articles such as spatulas, spoons, forks and many others.

Referring more particularly to FIG. 1, the knife as illustrated has a blade 10 and a handle 12. The knife is shown with its blade in horizontal position and for convenience such terms as "horizontal," "vertical," "upper" and "lower" will be used to define the relationship of the parts. However, such terms do not limit the invention as the knife may be in any position.

As shown in FIG. 2, the knife handle comprises a horizontal flat metallic blade shank 14 integral with the blade 10 and having a circular vertical hole 16 therein. The knife handle further comprises first and second handle portions 18 and 20 engaging said shank 12 at the lower and upper sides thereof and having substantially parallel lower and upper faces. The handle portions 18 and 20 may be formed of wood but the invention is not so limited. Said handle portions 18 and 20 respectively have first and second vertical holes 22 and 24 in register with each other and with the vertical hole 16 in the shank. The holes 22 and 24 are preferably slightly larger than the hole 16. Said handle portions 18 and 20 have first and second cylindrical counterbores 26 and 28 respectively at the lower and upper ends of said first and second holes 22 and 24. The lower and upper faces of the handle portions 18 and 20 are spaced apart by a definite predetermined dimension A.

A rivet cap 30 is provided which fits within said first counterbore 26, said cap 30 having a sharp corner at 31 and having a maximum vertical dimension which is the same as the vertical depth of said first counterbore. The cap 30 preferably has a flat lower face 32 and its sharp corner 31 enables it to completely fill the lower portion of the counterbore 26 so that there is no crevice within which food or other material could collect. The cap 30 preferably has an interior upwardly facing convex conical surface 33 with a large included angle, preferably on the order of 120°, and said cap also comprises an annular flange 34 which projects upwardly and defines an annular space 35 between said conical surface 33 and said flange. As shown in FIGS. 2 to 7, said flange 34 includes a portion 34ª which projects inwardly from the cylindrical peripheral portion of the flange. Said flange portion 34ª defines a circular central opening.

A rivet 36 is provided which comprises a head 38 that fits within the second counterbore 28, said head having a sharp peripheral corner at 39. The head 38 preferably has a flat upper face 40 and its sharp corner 39 enables it to completely fill the upper portion of the counterbore 28 so that there is no crevice within which food or other material could collect. The rivet 36 also comprises a solid imperforate stem 41 integral with said head 38 and extending downwardly therefrom through the vertical holes 24 and 22 in the handle portions and through the vertical hole 16 in the shank. The stem 41 has interlocking clinching engagement with said rivet cap 30 in said first countersink 26. As shown, the stem 41 has an annular outwardly projecting flange 42 which fits the space 35 in the cap between the flange 34 and the upwardly facing surface 33. Said flange 42 on the stem and said flange 34 on the cap provide the before-mentioned clinching engagement. The rivet stem 41 has its entire lower end area in direct engagement with a corresponding area of the upwardly facing surface 33 on the cap. The portion of the stem within the shank hole 16 is in radially outward pressure engagement with the interior of said hole. Preferably, said stem has slightly greater diameters at both sides of said shank 12 and within the holes 22 and 24.

The cap 30, as shown in FIGS. 3 and 4, is particularly suited for manufacture on an automatic screw machine, and such manufacture readily provides the sharp corner 31 which is very important for the reason that has been stated. It will be understood, however, that the caps may be made by cold heading or otherwise, and that the invention is not limited to caps made on a screw machine. When made on a screw machine, a blank 30ᵇ is machined during the first operation to form said sharp corner 31 and to form an annular cylindrical flange 34ᵇ. During the next following operation and as shown in FIG. 4, the outer or upper portion of the flange 34b is spun over to provide the before-described inwardly projecting flange 34a and the annular space 35.

FIG. 5 shows a rivet 36 as it appears prior to assembly. The rivet comprises the head 38 which is as before-described, but the stem 41 has a uniform diameter throughout its length which diameter is slightly less than that of the hole 16 in the shank 12 and slightly less than that of the central opening in the cap within the flange portion 34a. Said stem 41 at the lower end thereof has a shallow upwardly extending central hole 44 terminating at a downwardly facing surface 46 within the hole. The surface 46 is preferably conical with an included angle substantially less than that of the conical cap surface 33. As shown, the included angle of the surface 46 is on the order of 60°. The stem 41 is imperforate except as to the shallow hole 44.

The before-mentioned FIG. 5 also shows the rivet 36 and the cap 30 positioned for relative movement into engagement with each other. When endwise pressure is applied to force the stem 41 of the rivet into said cap 30, said pressure serves to outwardly spread the portion of the stem surrounding said hole 44 therein into the annular space 35 in the cap and serves to force the central portion of the conical surface 46 of the stem into direct engagement with the central portion of the conical surface 33 of the cap. The sum of the dimension B from the upper face 40 of the rivet to the center of the conical surface 46 in the hole in the rivet stem and the dimension C from the lower face 32 of the cap to the center of said conical surface 33 on said cap is approximately equal to said predetermined dimension A between the upper and lower faces of the handle portions 18 and 20. Preferably, the sum of dimensions B and C is slightly greater than dimension A.

Successive stages in the engagement of the rivet and the cap with each other and with the handle parts are shown in FIGS. 6, 7 and 2.

FIG. 6 shows the handle parts preliminarily assembled, the cap being entered in the counterbore 26 and the rivet being entered in the handle holes sufficiently to barely engage the cap.

As shown in FIG. 7, vertical pressure has been applied and the rivet has been relatively moved to such an extent that the lower portion of the stem around the hole 44 has been outwardly spread to form the before-mentioned flange 42 within the cap space 35. The entire lower end area of the rivet stem 41 is in direct engagement with a corresponding area of the conical cap surface 33. It will be also observed that the dimension between the end face 40 of the rivet head and the end face 32 of the cap is slightly greater than the before-mentioned dimension A between the upper and lower faces of the handle portions 18 and 20.

As shown in FIG. 2, the rivet has been additionally pressed so that the dimension between the faces 40 and 32 has been reduced and is exactly the sum of the dimensions B and C and is therefore the same as predetermined dimension A between the faces of the handle portions. This additional or final pressing of the rivet causes the stem to expand radially outwardly, and in so expanding the stem is forced into radially outward pressure engagement with the interior of the hole 16 in the blade shank 12. Said shank resists outward expansion, but the handle portions 18 and 20 either do not resist expansion or resist it to a lesser extent, and the shank therefore has slightly greater diameters above and below said shank. The described pressure engagement between the stem serves to firmly hold the shank in place.

The rivet 36 shown in FIG. 8 is or may be the same as that shown in FIG. 3, and the cap 48 shown in said FIG. 8 is or may be the same as that shown in FIG. 3 except as to the annular flange 50. Said flange 50 projects upwardly to an extent substantially greater than the depth of the second counterbore in the lower handle portion. The peripheral surface of said flange 50 is cylindrical and said flange is tapered and it has a thin upper portion that is inwardly foldable as hereinafter explained. The cap 48 may readily be made on a screw machine, but the invention is not so limited. The sum of the dimensions B and C is approximately equal to the dimension A as previously explained.

Figure 9:
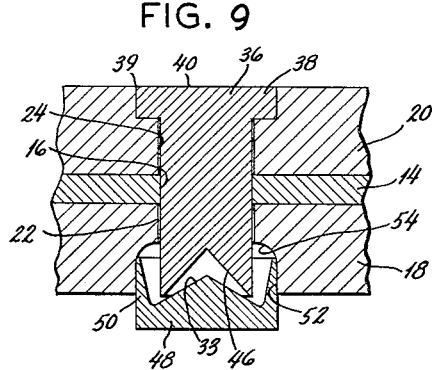
FIG. 9 is a view similar to FIG. 6, but showing the alternative cap.
Figure 10:
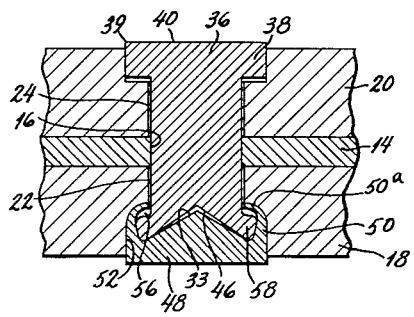
FIG. 10 is a view similar to FIG. 7, but showing the alternative cap.
Figure 11:
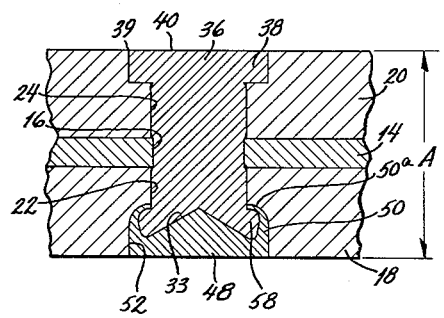
FIG. 11 is a view similar to FIG. 2, but showing the alternative cap.

The handle parts as shown in FIGS. 9 to 11 are or may be the same as those shown in FIGS. 1, 2, 6 and 7, except as to the lower or first counterbore 52. Said counterbore 52 has or may have the same diameter and the same depth as the counterbore 26, but a curved surface 54 is preferably provided which is tangent to the cylindrical periphery and is tangent to the downwardly exposed upper face of said counterbore.

Successive stages in the engagement of the rivet 36 and the cap 48 with each other and with the handle parts are shown in FIGS. 9, 10 and 11.

FIG. 9 shows the handle parts preliminarily assembled, the cap 48 being entered in the counterbore to the extent permitted by the flange 50 and by the curved surface 54 and the rivet 36 being entered in the handle holes sufficiently to barely engage the cap.

As shown in FIG. 10, vertical pressure has been applied and the cap has been moved upwardly relatively to the lower handle portion. In so moving the upper portion of the cap, the flange 50 has been bent or folded inwardly to form an inwardly projecting flange portion 50a similar to the flange portion 34a. The bending or folding has been effected by the curved surface 54, and an annular space 56 has been formed within the cylindrical portion of the flange and below the inwardly projecting portion thereof.

Simultaneously with the upward movement of the cap relatively to the lower handle portion, there has been downward movement of the rivet relatively to the cap. As the result of the downward movement of the rivet, the lower portion of the stem around the hole 44 has been outwardly spread to partly form a flange 58 within the cap space 56. The cap 48 has not yet been fully entered in the lower counterbore and the rivet head has not yet been fully entered in the upper counterbore.

The vertical pressure is continued until the parts reach the positions shown in FIG. 11, these positions being very similar to those shown in FIG. 2. The entire lower end area of the rivet stem 41 is in direct engagement with a corresponding area of the conical cap surface 33. The rivet 36 has been pressed so that the dimension between the faces 40 and 32 has been reduced and is exactly the sum of the dimensions B and C and is therefore the same as predetermined dimension A between the faces of the handle portions. This final pressing of the rivet causes the stem to expand radially outwardly, and in so expanding the stem is forced into radially outward pressure engagement with the interior of the hole 16 in the blade shank 12. Said shank resists outward expansion, but the handle portions 18 and 20 either do not resist expansion or resist it to a lesser extent, and the shank therefore has slightly greater diameters above and below said shank. The described pressure engagement between the stem serves to firmly hold the shank in place.

Figure 12:
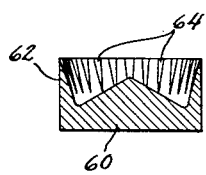
FIG. 12 is a view similar to the lower portion of FIG. 8 but showing another alternative cap.
Figure 13:
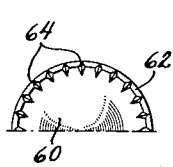
FIG. 13 is a fragmentary plan view of the cap shown in FIG. 12.

FIGS. 12 and 13 show an alternative cap 60 which is the same as the cap 48, except that its flange 62 has notches or grooves 64, 64 for facilitating the bending or folding described in connection with FIGS. 9, 10 and 11.

The invention claimed is:

1. In a handle for a knife or similar article, the combination of a horizontal flat metallic blade shank having a circular vertical hole therein, first and second handle portions engaging said shank at the lower and upper sides thereof and having parallel lower and upper faces, said handle portions respectively having first and second vertical holes in register with each other and with the hole in the shank and having first and second cylindrical counterbores respectively at the lower and upper ends of said first and second holes, a sharp-cornered rivet cap fitting and completely filling the lower portion of said first counterbore, said cap having a flat outer face flush with the lower face of said first handle portion and said cap having a maximum vertical dimension which is the same as the counterbore depth and which cap has an annular flange providing a space within it, and a rivet comprising a sharp-cornered head fitting and completely filling the upper portion of the second counterbore and having a flat outer face flush with the upper face of said second handle portion and said rivet also comprising a solid imperforate stem integral with said head and extending downwardly therefrom through the said vertical holes in the handle portions and in the shank which stem has an outwardly extending portion in interlocking clinching engagement with the flange of said rivet cap in said first counterbore, said rivet stem having its entire lower end area in direct engagement with a corresponding area of the interior of said cap and the portion of said rivet stem within the hole in the shank being in radially outward pressure engagement with the interior of said hole.

2. In a handle for a knife or similar article, the combination of a horizontal flat metallic blade shank having a circular vertical hole therein, first and second handle portions engaging said shank at the lower and upper sides thereof and having parallel lower and upper faces, said handle portions respectively having first and second vertical holes in register with each other and with the hole in the shank and having first and second cylindrical counterbores respectively at the lower and upper ends of said first and second holes, a sharp-cornered rivet cap fitting and completely filling the lower portion of said first counterbore which cap has a flat lower face and has an interior upwardly facing convex conical surface with a large included angle and said cap also having an annular flange projecting radially inwardly from the cap periphery which flange provides an annular space between it and said upwardly facing conical surface and which flange defines a circular central opening, and a rivet comprising a sharp-cornered head fitting and completely filling the upper portion of the second counterbore and having a flat upper face flush with the upper face of said second handle portion and said rivet also comprising a solid imperforate stem integral with said head and extending downwardly therefrom through the said vertical holes in the handle portions and in the shank and through the central opening in the cap, said rivet stem having an annular radially outwardly projecting flange fitting the space between the upwardly facing surface of said cap and the annular flange thereof and said stem having its entire lower end area in direct engagement with a corresponding area of the upwardly facing surface of said cap and the portion of said stem within the hole in the shank being in radially outward pressure engagement with the interior of said hole.

3. A two-part rivet device adapted for connecting the metallic blade shank and the lower and upper portions of a handle for a knife or similar article which shank and upper and lower portions have registering vertical holes therein, said two-part device comprising in combination, a sharp-cornered cylindrical cap having a flat lower face and having an interior upwardly facing convex conical surface with a large included angle which cap also comprises an annular flange providing an annular space between it and said upwardly facing conical surface, and a rivet comprising an upper sharp-cornered cylindrical head having a flat upper face and also comprising a cylindrical stem integral with said head and extending downwardly therefrom, said rivet stem having an upwardly extending central hole terminating at a concave conical upper surface with an included angle substantially less than that of the conical cap surface and said stem being imperforate except for said hole, said cap and rivet stem being so proportioned that vertical pressure applied to force the lower portion of said stem into said cap serves to spread the portion of the stem surrounding said hole into the annular space in the cap and serves to force the central portion of the conical surface of the stem into direct engagement with the central portion of the conical surface of the cap.

4. A two-part rivet device adapted for connecting the metallic blade shank and the lower and upper portions of a handle for a knife or similar article which shank and upper and lower portions have registering vertical holes therein, said two-part device comprising in combination, a sharp-cornered cylindrical cap having a flat lower face and having an interior upwardly facing convex conical surface with a large included angle which cap also comprises an annular flange having a portion which projects radially inwardly which flange provides an annular space between it and said upwardly facing conical surface and said inwardly projecting portion of the flange defining a circular central opening, and a rivet comprising an upper sharp-cornered cylindrical head having a flat upper face and also comprising a cylindrical stem integral with said head and extending downwardly therefrom, said rivet stem having a diameter slightly less than the diameter of the central opening in the cap and said stem at the lower end thereof having an upwardly extending central hole terminating at a concave conical upper surface with an included angle substantially less than that of the conical cap surface, said cap and said rivet stem being so proportioned that endwise pressure applied to force said stem into said cap serves to spread the portion of the stem surrounding said hole therein into the annular space in the cap and serves to force the central portion of the conical surface of the stem into direct engagement with the central portion of the conical surface of the cap.

5. A two-part rivet device as set forth in claim 4, wherein the included angle of the conical surface of the cap is on the order of 120°, and wherein the included angle of the conical surface in the hole in the rivet stem is on the order of 60°.

6. A two-part rivet device adapted for connecting the metallic blade shank and the lower and upper portions of a handle for a knife or similar article which shank and upper and lower portions have registering vertical holes therein which upper and lower handle portions respectively have first and second counterbores at the upper and lower ends of said holes therein, said two-part device comprising in combination, a sharp-cornered cylindrical cap having a flat lower face and having an interior upwardly facing convex conical surface with a large included angle which cap also comprises an annular flange projecting upwardly to an extent substantially greater than the depth of the second counterbore and having a thin inwardly foldable upper portion and which flange provides an annular space between it and said upwardly facing conical surface of the cap, and a rivet comprising an upper sharp-cornered cylindrical head having a flat upper face and also comprising a cylindrical stem integral with said head and extending downwardly therefrom, said rivet stem at the lower end thereof having an upwardly extending central hole terminating at a downwardly facing surface within the hole and said stem being imperforate except for said hole, said cap and said rivet stem being so proportioned that endwise pressure applied to force said stem into said cap serves to spread the portion of the stem surrounding said hole therein into the annular space in the cap and serves to force the central portion of the downwardly facing surface of the stem into direct engagement with the central portion of the conical surface of the cap.

7. A two-part rivet device adapted for connecting the metallic blade shank and the lower and upper portions of a handle for a knife or similar article which shank and upper and lower portions have registering vertical holes therein which upper and lower handle portions respectively have first and second counterbores at the upper and lower ends of said holes therein, said two-part device comprising in combination, a sharp-cornered cylindrical cap having a flat lower face and having an interior upwardly facing convex conical surface with a large included angle which cap also comprises an annular flange projecting upwardly to an extent substantially greater than the depth of the second counterbore and having a thin inwardly foldable upper portion and which flange provides an annular space between it and said upwardly facing conical surface of the cap, and a rivet comprising an upper sharp-cornered cylindrical head having a flat upper face and also comprising a cylindrical stem integral with said head and extending downwardly therefrom, said rivet stem at the lower end thereof having an upwardly extending central hole terminating at a concave conical upper surface with an included angle substantially less than that of the conical cap surface and said stem being imperforate except for said hole, said cap and said rivet stem being so proportioned that endwise pressure applied to force said stem into said cap serves to spread the portion of the stem surrounding said hole therein into the annular space in the cap and serves to force the central portion of the conical surface of the stem into direct engagement with the central portion of the conical surface of the cap.

References Cited in the file of this patent

UNITED STATES PATENTS

| | | |
|---|---|---|
| 340,117 | Holt | Apr. 20, 1886 |
| 585,274 | Lyda | June 29, 1897 |
| 1,092,362 | Herkens | Apr. 7, 1914 |
| 1,705,794 | Wheeler et al. | Mar. 19, 1929 |
| 1,993,170 | Havener | Mar. 5, 1935 |
| 2,154,012 | Rhodes | Apr. 11, 1939 |
| 2,327,924 | Mounts | Aug. 24, 1943 |
| 2,410,572 | Echikson | Nov. 5, 1946 |
| 2,492,096 | Juengst | Dec. 20, 1949 |
| 2,529,618 | Slavsky | Nov. 14, 1950 |
| 2,670,647 | Jones | Mar. 2, 1954 |